United States Patent
Li et al.

(10) Patent No.: US 8,193,723 B2
(45) Date of Patent: Jun. 5, 2012

(54) LED CURRENT-BALANCE DRIVING CIRCUIT

(75) Inventors: Shin-An Li, Zhonghe (TW); Chi-Hsin Li, Zhonghe (TW)

(73) Assignee: Top Victory Investments Ltd., Harbour City (HK)

( * ) Notice: Subject to any disclaimer, the term of this patent is extended or adjusted under 35 U.S.C. 154(b) by 207 days.

(21) Appl. No.: 12/815,519

(22) Filed: Jun. 15, 2010

(65) Prior Publication Data

US 2010/0315013 A1    Dec. 16, 2010

(30) Foreign Application Priority Data

Jun. 15, 2009  (TW) .............................. 98210625 U

(51) Int. Cl.
*H05B 37/02*    (2006.01)

(52) U.S. Cl. ........ 315/276; 315/219; 315/279; 315/282; 315/307

(58) Field of Classification Search .................. 315/276, 315/278, 277, 279, 282, 307, 308, 291, 219, 315/220, 224

See application file for complete search history.

(56) References Cited

U.S. PATENT DOCUMENTS

| | | | |
|---|---|---|---|
| 7,262,559 B2 * | 8/2007 | Tripathi et al. | 315/291 |
| 7,772,782 B2 * | 8/2010 | Chu et al. | 315/247 |
| 7,906,917 B2 * | 3/2011 | Tripathi et al. | 315/291 |
| 8,044,609 B2 * | 10/2011 | Liu | 315/291 |

* cited by examiner

*Primary Examiner* — David Hung Vu
(74) *Attorney, Agent, or Firm* — Alan Kamrath; Kamrath IP Lawfirm, PA

(57) ABSTRACT

An LED current-balance driving circuit for driving a plurality of LED strings comprises a feedback transformer, a plurality of current-balance transformers, a plurality of full-wave rectifiers and a current control circuit. The feedback transformer has a detecting winding and an outputting winding for outputting a feedback signal. Each of the current-balance transformers has a primary winding and a secondary winding. The primary windings of the current-balance transformers and the detecting winding of the feedback transformer are coupled in series to compose a current-balance loop with an AC power being supplied thereto. Each of the full-wave rectifiers is coupled between a corresponding secondary winding of the current balance transformers and a corresponding LED string of the LED strings. The current control circuit receives the feedback signal and controls the AC power according to the feedback signal.

9 Claims, 8 Drawing Sheets

LED CURRENT-BALANCE DRIVING CIRCUIT

BACKGROUND OF THE INVENTION

1. Field of the Invention

The present invention relates to a light-emitting diode (LED) driving circuit and, more particularly, to an LED current-balance driving circuit for driving a plurality of LED strings.

2. Description of the Prior Art

FIG. 1 is a block diagram showing a conventional LED driving circuit for driving a plurality of LED strings. Referring to FIG. 1, an alternating-current (AC) power input 101A, such as a household power, is supplied to a commutation circuit 110 and converted to a direct-current (DC) power. The DC power is then supplied to a power factor correction (PFC) circuit 106 and converted to a high-voltage DC voltage VDC1 (approximately 80V~400V). The high-voltage DC voltage VDC1 is supplied to an isolated DC-to-DC converter 107 and converted to a low-voltage DC voltage VDC2 (approximately 5V~60V). The isolated DC-to-DC converter 107 divides the LED driving circuit in a primary side and a secondary side. Then, the low-voltage DC voltage VDC2 is supplied to a conventional LED current-balance driving circuit 108 located in the secondary side.

FIG. 2 is a circuit diagram showing the conventional LED current-balance driving circuit 108 in FIG. 1. Referring to FIG. 2, the low-voltage DC voltage VDC2 is supplied to a current control circuit 111A. The current control circuit 111A outputs a driving signal to control the conductive time of the transistor Q1 according to a current feedback signal generated by the resistor R1 coupled to the transistor Q1 so as to decide the time for the inductor L1 to charge the capacitor C1 through the diode D1. The output voltage VO across the capacitor C1 as well as the output power is thus controlled. Each LED string 105A,105B, . . . ,105M is series-coupled to a respective transistor QA,QB, . . . ,QM and a respective resistor RA,RB, . . . ,RM. The current control circuit 111A also outputs driving signals to control the transistors QA,QB, . . . ,QM according to the feedback signals from the resistors RA,RB, . . . ,RM so as to adjust the currents IOA, IOB, . . . ,IOM flowing through the LED strings to achieve the object of current balance.

However, the above mentioned LED current-balance driving circuit needs a plurality of transistors to control the currents flowing through the LED strings. When the number of the LED strings is increased, the power dissipation on the transistors will become significant.

SUMMARY OF THE INVENTION

The present invention provides an LED current-balance driving circuit for driving a plurality of LED strings by using transformers instead of transistors to achieve current balance and simultaneously avoid the power dissipation on the transistors.

The LED current-balance driving circuit of the present invention for driving a plurality of LED strings comprises a feedback transformer, a plurality of current-balance transformers, a plurality of full-wave rectifiers and a current control circuit. The feedback transformer has a detecting winding and an outputting winding for outputting a feedback signal. Each of the current-balance transformers has a primary winding and a secondary winding. The primary windings of the current-balance transformers and the detecting winding of the feedback transformer are coupled in series to compose a current-balance loop with an alternating-current (AC) power being supplied thereto. Each of the full-wave rectifiers is coupled between a corresponding secondary winding of the current balance transformers and a corresponding LED string of the LED strings. The current control circuit receives the feedback signal and controls the AC power according to the feedback signal.

According to an embodiment of the present invention, the current-balance transformers employ isolated transformers, and the AC power is supplied by a non-isolated switching-mode power supply.

According to another embodiment of the present invention, the current-balance transformers employ non-isolated transformers, and the AC power is supplied by an isolated switching-mode power supply.

According to still another embodiment of the present invention, the current-balance transformers employ non-isolated transformers, and the AC power is supplied by a non-isolated switching-mode power supply.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Figure 1:
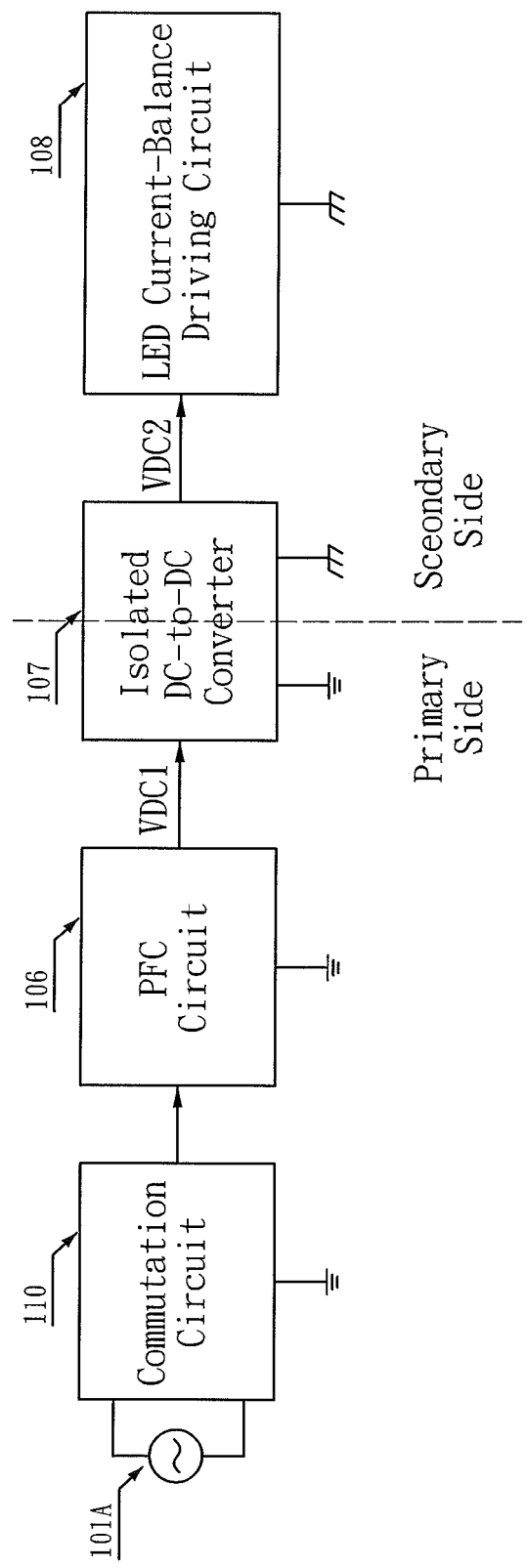
FIG. 1 is a block diagram showing a conventional LED driving circuit for driving a plurality of LED strings.
Figure 2:
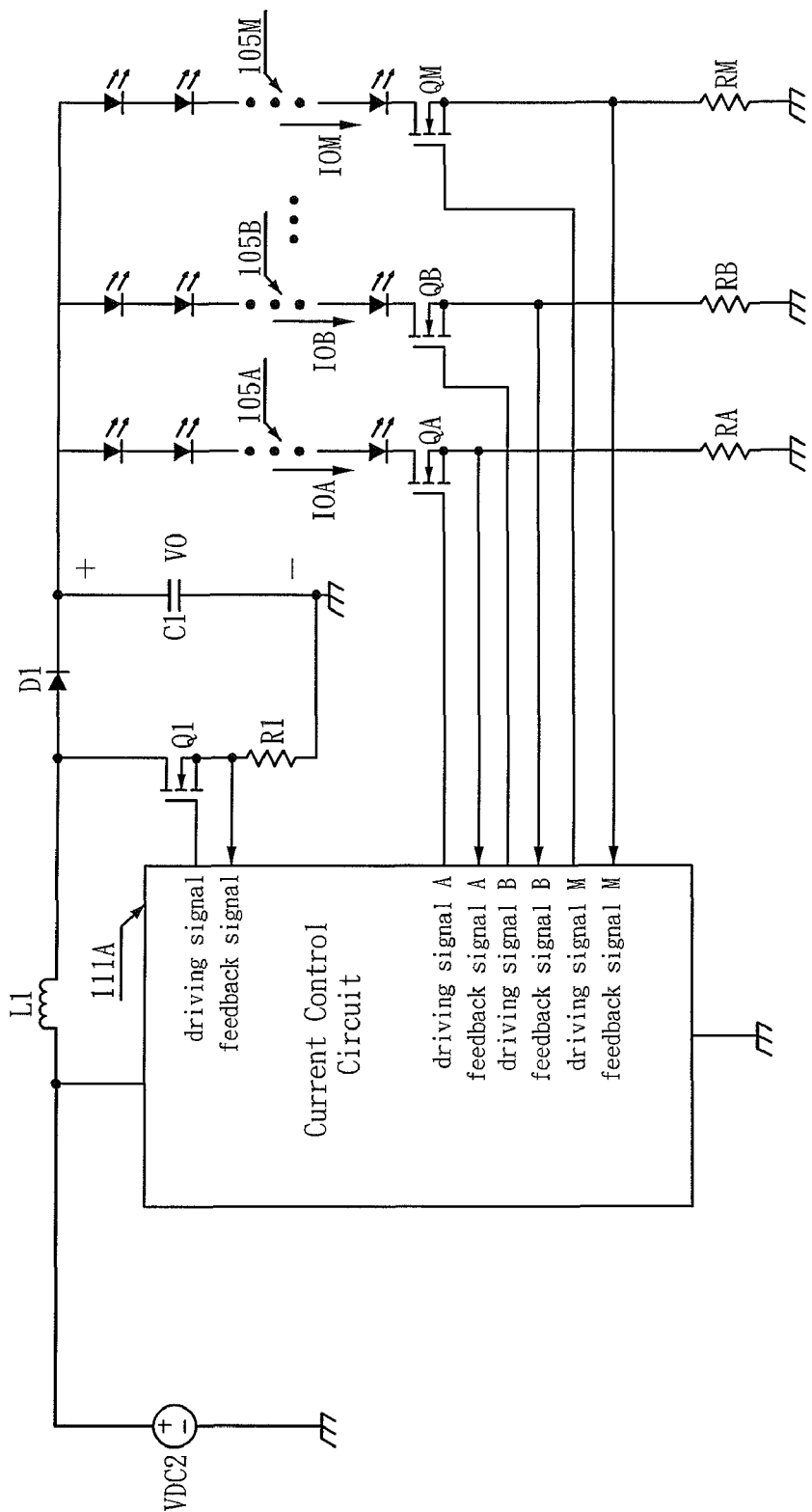
FIG. 2 is a circuit diagram showing the conventional LED current-balance driving circuit in FIG. 1.

Reference will now be made in detail to the preferred embodiments of the present invention, examples of which are illustrated in the accompanying drawings. Wherever possible, the same reference numbers are used in the drawings and the description to refer to the same or like parts.

Figure 3:
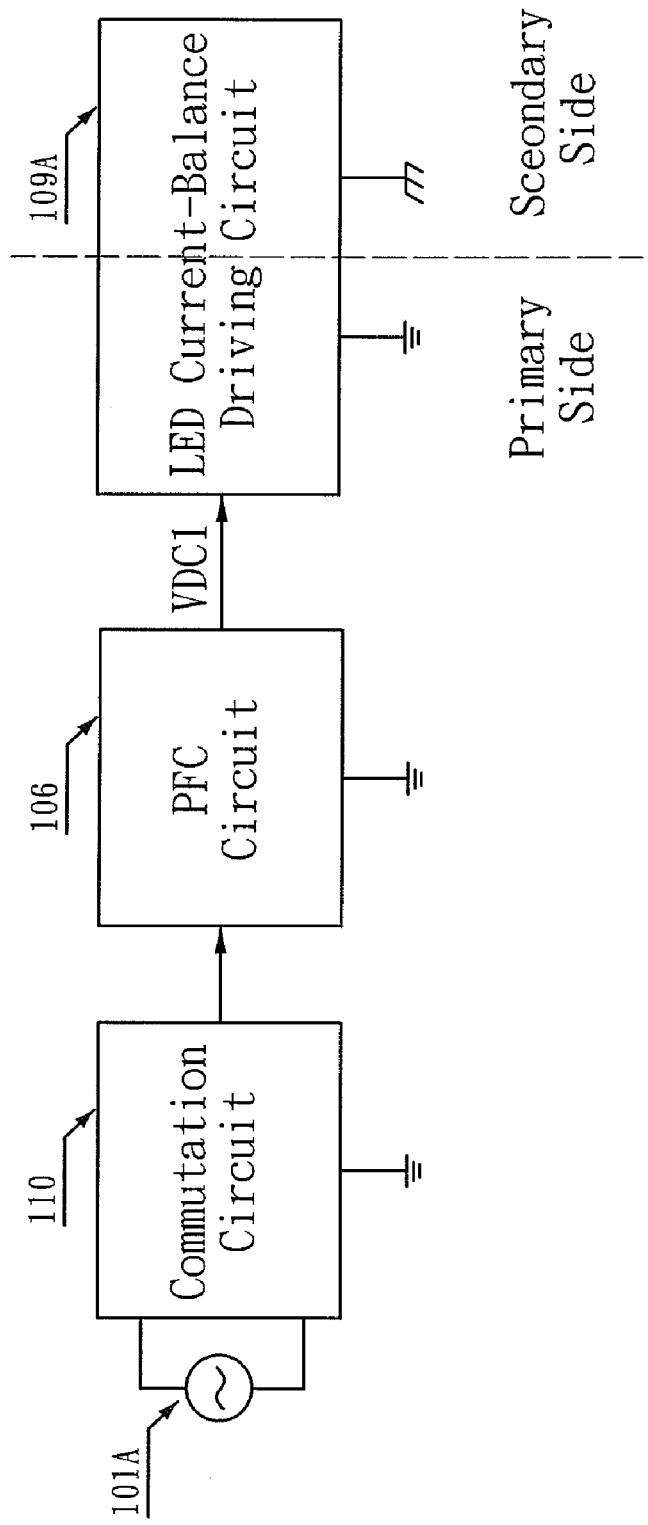
FIG. 3 is a block diagram showing an LED driving circuit for driving a plurality of LED strings in accordance with a preferred embodiment of the present invention.

FIG. 3 is a block diagram showing an LED driving circuit for driving a plurality of LED strings in accordance with a preferred embodiment of the present invention. Referring to FIG. 3, the dashed line indicates the range of the primary side and the secondary side of the LED driving circuit, and an LED current-balance driving circuit 109A is located in the primary side and the secondary side. An AC power input 101A, such as a household power, is supplied to a commutation circuit 110 and converted to a DC power. The DC power is then supplied to a PFC circuit 106 and converted to a high-voltage DC voltage VDC1 (approximately 80V to 400V). Then, the high-voltage DC voltage VDC1 is supplied to the LED current-balance driving circuit 109A.

Figure 4:
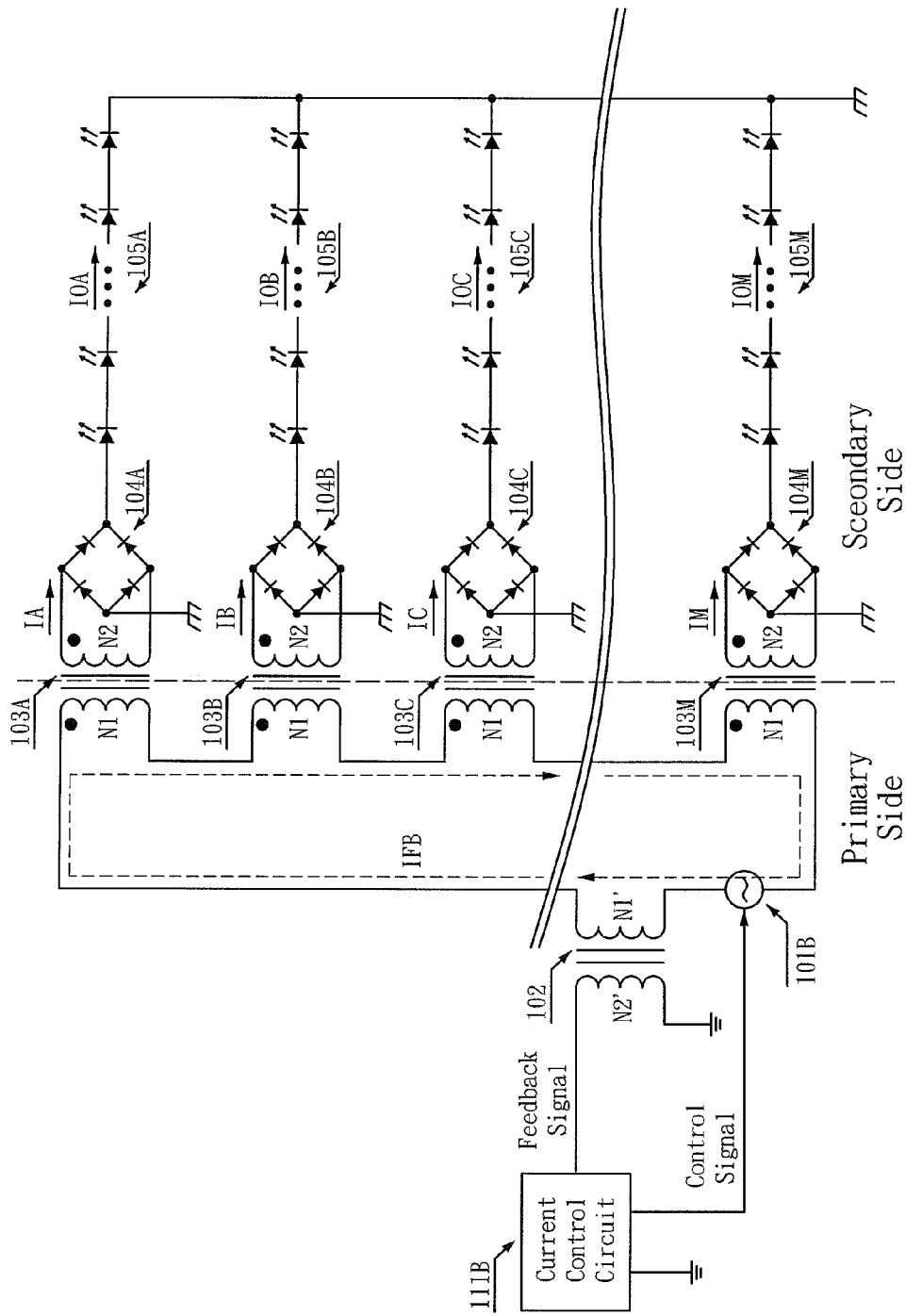
FIG. 4 is a circuit diagram showing the LED current-balance driving circuit in FIG. 3.

FIG. 4 is a circuit diagram showing the LED current-balance driving circuit 109A in FIG. 3. Referring to FIGS. 3 and 4, the LED current-balance driving circuit 109A for driving a plurality of LED strings 105A,105B,105C, . . . ,105M includes a feedback transformer 102, a plurality of current-balance transformers 103A,103B,103C, . . . ,103M, a plurality of full-wave rectifiers 104A,104B,104C, . . . ,104M and a current control circuit 111B. The feedback transformer 102 has a detecting winding N1' and an outputting winding N2'. Each of the current-balance transformers 103A,103B, 103C, . . . ,103M has a primary winding N1 and a secondary winding N2. The primary windings N1 of all the current-balance transformers 103A,103B,103C, . . . ,103M are coupled with each other in series. The series-coupled primary windings N1 are then coupled to a feedback transformer 102 and an AC power supply 101B, so as to compose a current-balance loop with a balance current IFB flowing therethrough and an AC power (provided by the AC power supply 101B) supplied thereto. The outputting winding N2' of the feedback transformer 102 outputs a feedback signal according to the balance current IFB flowing through the current-balance loop. The current control circuit 111B receives the feedback signal and controls the AC power provided by the AC power supply 101B according to the feedback signal.

In addition, turns ratios of the current-balance transformers 103A,103B,103C, . . . ,103M are the same. Thus, the output current IA,IB,IC, . . . ,IM of the secondary windings N2 of the current-balance transformers 103A,103B,103C, . . . ,103M would be the same because of the identical current IFB flowing through the primary winding N1 of each of the current-balance transformers 103A,103B,103C, . . . ,103M. Each of the full-wave rectifiers 104A,104B,104C, . . . ,104M, such as a bridge rectifier, is coupled between a corresponding secondary winding of the current balance transformers 103A, 103B,103C, . . . ,103M and a corresponding LED string of the LED strings 105A,105B,105C, . . . ,105M. For example, the full-wave rectifiers 104B is coupled between the corresponding secondary winding N2 of the current balance transformer 103B and the corresponding LED string 105B. The full-wave rectifiers 104A,104B,104C, . . . ,104M convert the output currents IA,IB,IC, . . . ,IM of the secondary windings N2 to DC currents IOA,IOB,IOC, . . . ,IOM to drive the LED strings 105A,105B,105C, . . . ,105M. The LED strings 105A,105B, 105C, . . . ,105M would be operated under the same condition because of the same output current IA,IB,IC, . . . ,IM therefore, the object of balancing the current flowing through the LED strings 105A,105B,105C, . . . ,105M can be achieved.

In the present embodiment, the current-balance transformers 103A,103B,103C, . . . ,103M employ isolated transformers; therefore, the LED current-balance driving circuit 109A is located in the primary side and the secondary side, and the AC power supply 101B can employ a non-isolated switching-mode power supply. The non-isolated switching-mode power supply includes the commutation circuit 110, the PFC circuit 106 and a DC-to-AC converter (not shown). The DC-to-AC converter, such as a half-bridge or full-bridge DC-to-AC converter, receives the high-voltage DC voltage VDC1 and converted it to the AC power according a control signal, which is generated by the current control circuit 111B according to the feedback signal.

Figure 5:
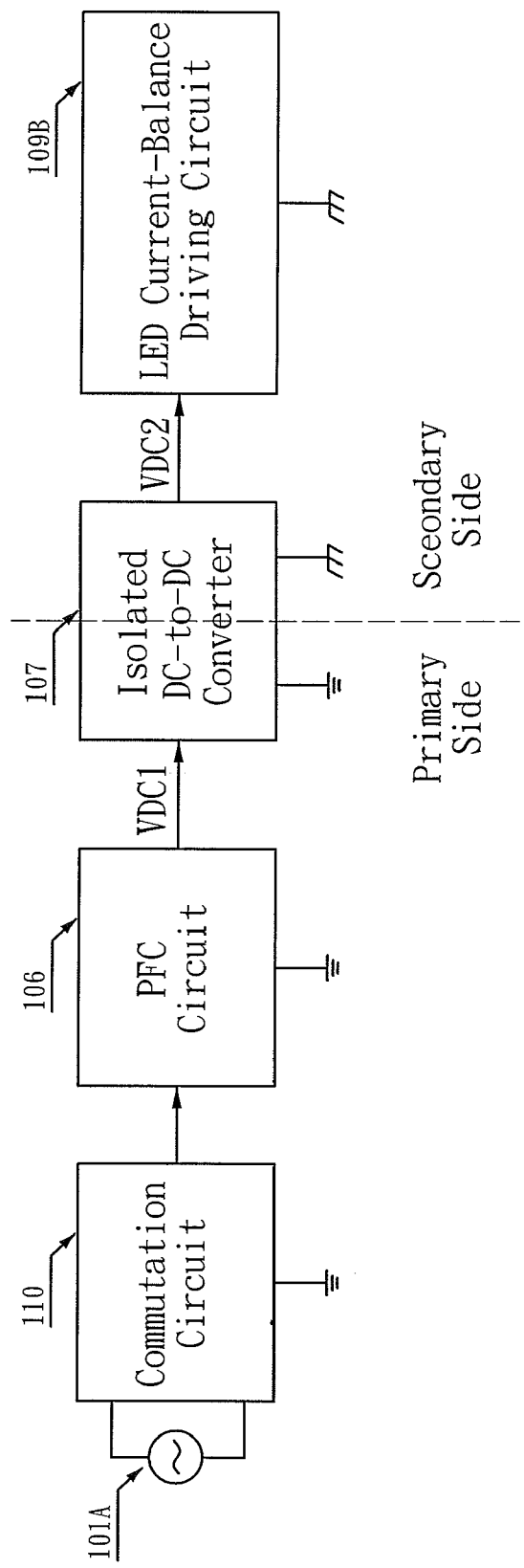
FIG. 5 is a block diagram showing an LED driving circuit for driving a plurality of LED strings in accordance with another preferred embodiment of the present invention.

FIG. 5 is a block diagram showing an LED driving circuit for driving a plurality of LED strings in accordance with another preferred embodiment of the present invention. Referring to FIG. 5, the dashed line indicates the range of the primary side and the secondary side of the LED driving circuit, and the LED current-balance driving circuit 109B is totally located in the secondary side. An AC power input 101A is supplied to a commutation circuit 110 and converted to a DC power. The DC power is then supplied to a PFC circuit 106 and converted to a high-voltage DC voltage VDC1. The high-voltage DC voltage VDC1 is supplied to an isolated DC-to-DC converter 107 and converted to a low-voltage DC voltage VDC2. The isolated DC-to-DC converter 107 divides the LED driving circuit in a primary side and a secondary side. Then, the low-voltage DC voltage VDC2 is supplied to the LED current-balance driving circuit 109B.

Figure 6:
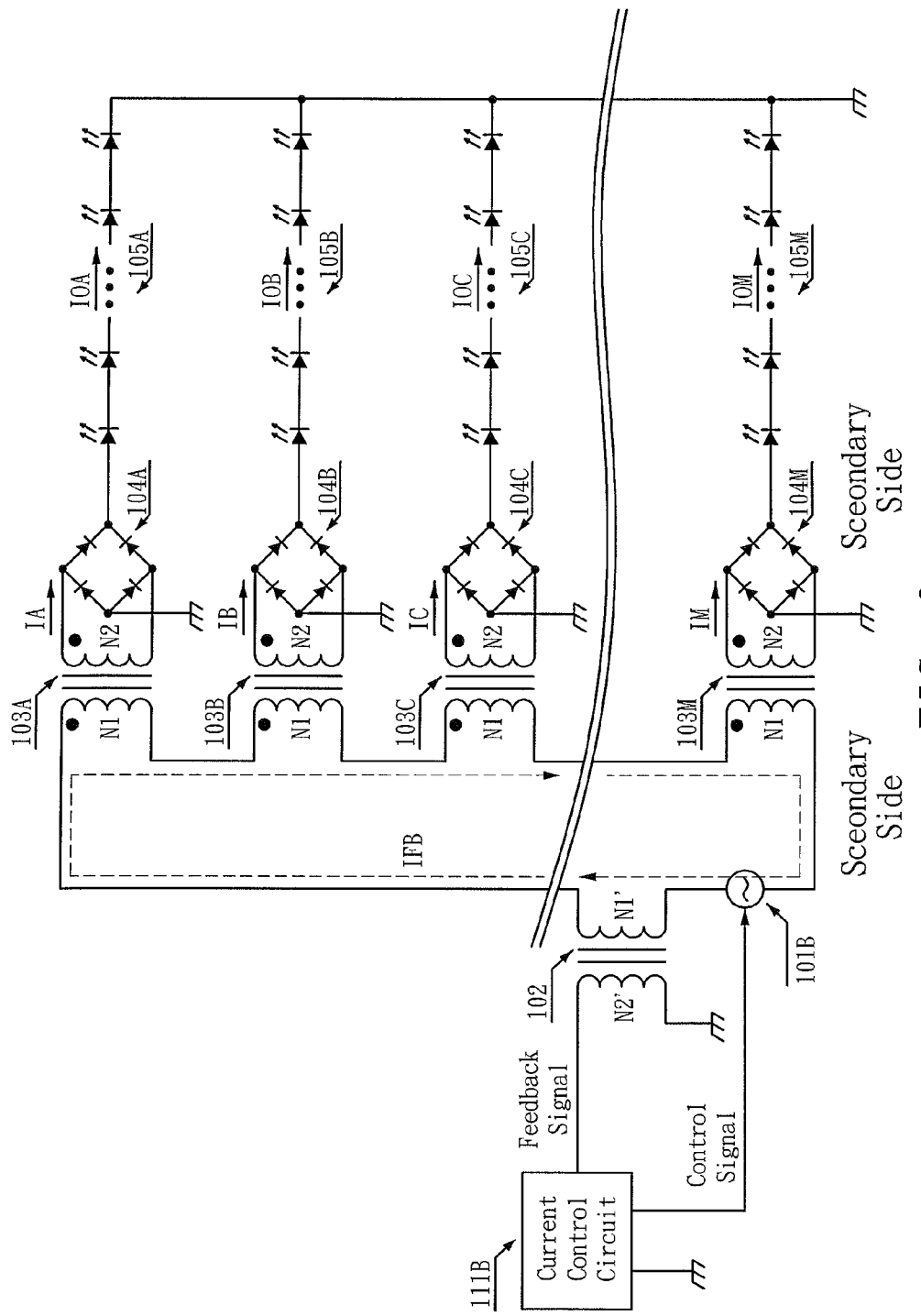
FIG. 6 is a circuit diagram showing the LED current-balance driving circuit in FIG. 5.

FIG. 6 is a circuit diagram showing the LED current-balance driving circuit 109B in FIG. 5. Referring to FIGS. 5 and 6, the major difference between the LED current-balance driving circuit 109B in the present embodiment and the LED current-balance driving circuit 109A in FIG. 4 is that the LED current-balance driving circuit 109B is totally located in the secondary side. In the present embodiment, the current-balance transformers 103A,103B,103C, . . . ,103M employ non-isolated transformers, and the AC power supply 101B can employ an isolated switching-mode power supply. The isolated switching-mode power supply includes the commutation circuit 110, the PFC circuit 106, the isolated DC-to-DC converter 107 and a DC-to-AC converter (not shown). The DC-to-AC converter, such as a half-bridge or full-bridge DC-to-AC converter, receives the low-voltage DC voltage VDC2 and converted it to the AC power according a control signal, which is generated by the current control circuit 111B according to the feedback signal.

Figure 7:
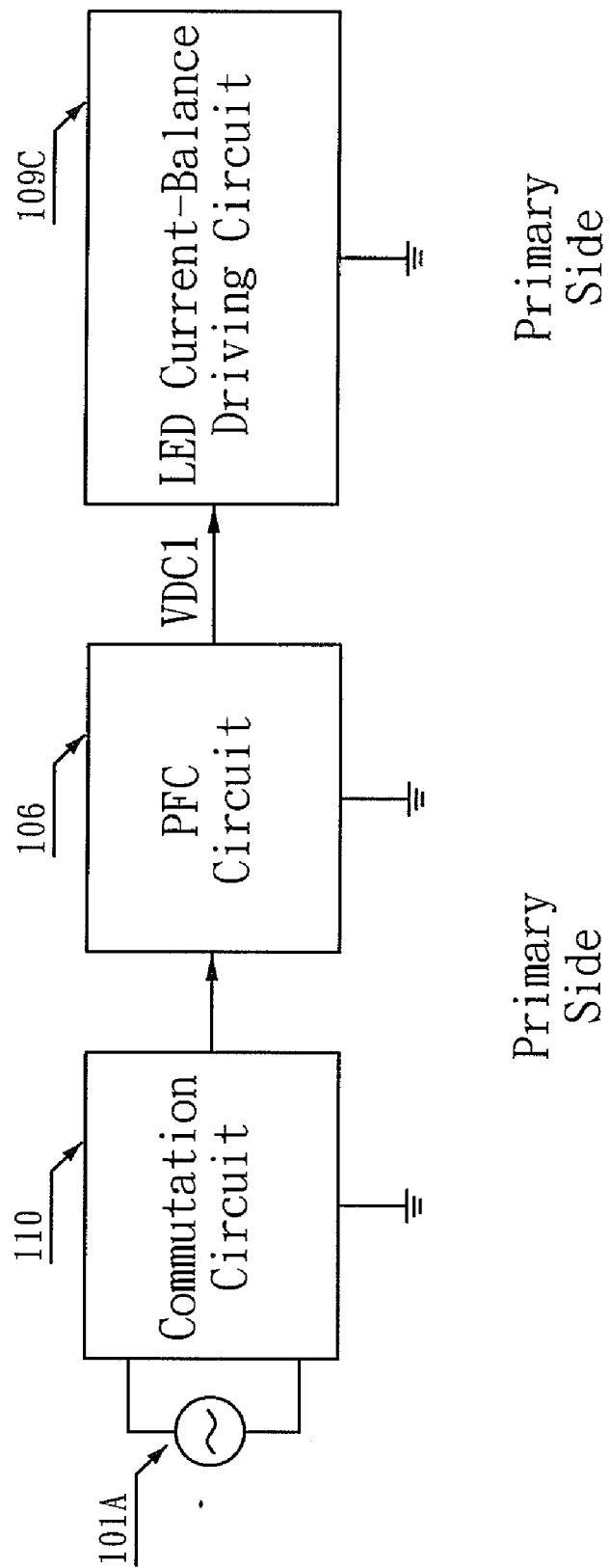
FIG. 7 is a block diagram showing an LED driving circuit for driving a plurality of LED strings in accordance with still another preferred embodiment of the present invention.

FIG. 7 is a block diagram showing an LED driving circuit for driving a plurality of LED strings in accordance with still another preferred embodiment of the present invention. Referring to FIG. 7, the LED current-balance driving circuit 109C is totally located in the primary side. An AC power input 101A is supplied to a commutation circuit 110 and converted to a DC power. The DC power is then supplied to a PFC circuit 106 and converted to a high-voltage DC voltage VDC1. Then, the high-voltage DC voltage VDC1 is supplied to the LED current-balance driving circuit 109C.

Figure 8:
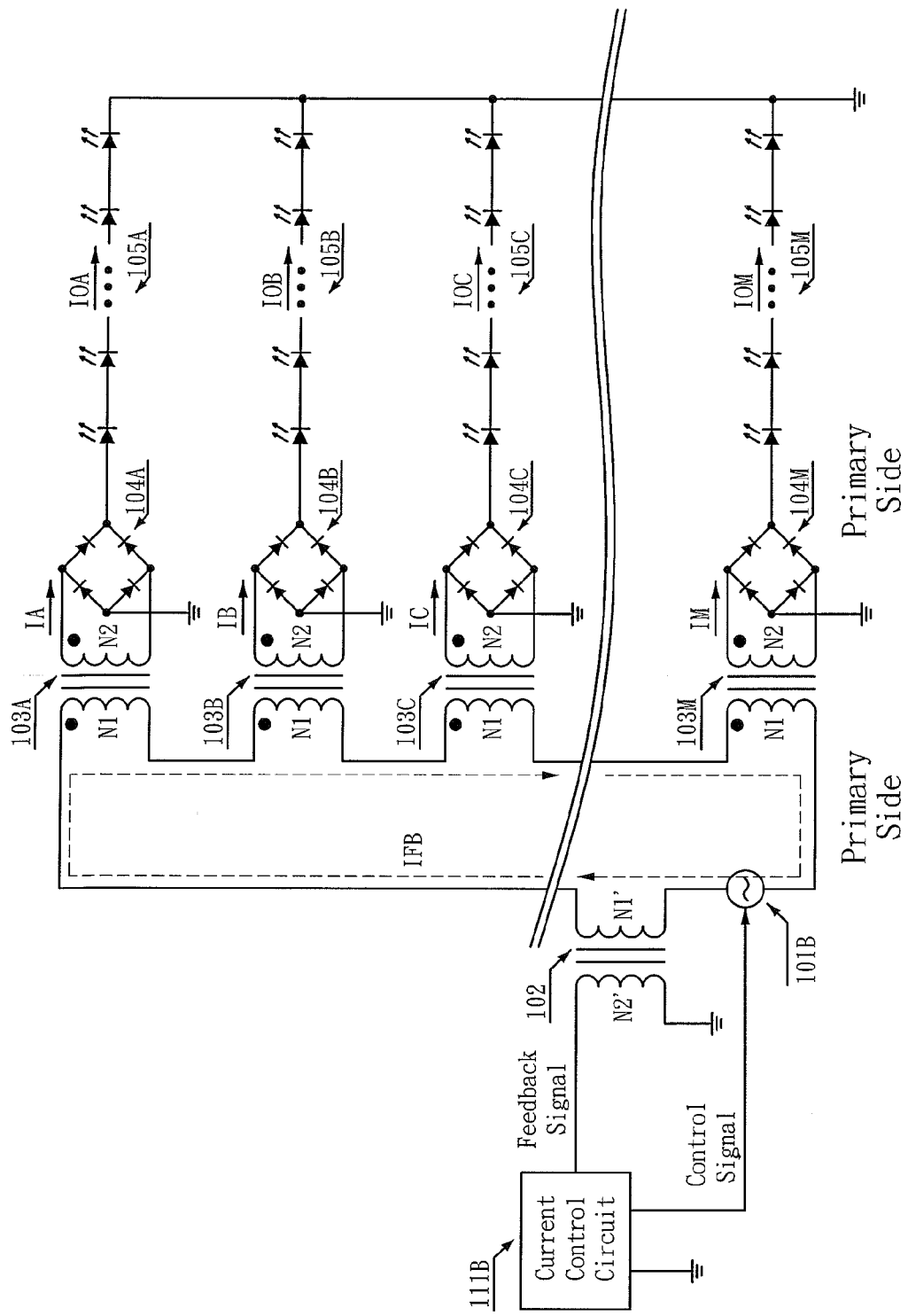
FIG. 8 is a circuit diagram showing the LED current-balance driving circuit in FIG. 7.

FIG. 8 is a circuit diagram showing the LED current-balance driving circuit 109C in FIG. 7. Referring to FIGS. 7 and 8, the major difference between the LED current-balance driving circuit 109C in the present embodiment and the LED current-balance driving circuit 109A in FIG. 4 is that the LED current-balance driving circuit 109C is totally located in the primary side. In the present embodiment, the current-balance transformers 103A,103B,103C, . . . ,103M employ non-isolated transformers, and the AC power supply 101B employ a non-isolated switching-mode power supply. The non-isolated switching-mode power supply includes the commutation circuit 110, the PFC circuit 106 and a DC-to-AC converter (not shown). The DC-to-AC converter, such as a half-bridge or full-bridge DC-to-AC converter, receives the high-voltage DC voltage VDC1 and converted it to the AC power according a control signal, which is generated by the current control circuit 111 B according to the feedback signal.

In conclusion, the present invention has the flowing advantages:

1. In order to control the amount of current flowing through each of the LED strings, the LED current-balance driving circuit of the present invention only needs one feedback transformer, which generates a feedback signal for the current control circuit to achieve the object of current balance.
2. Referring to FIG. 3, the LED current-balance driving circuit located in the primary side and the secondary side can be driven by using the high-voltage DC voltage VDC1 from the PFC circuit 106. Thus, the DC-to-DC converter 107 can be skipped to reduce the cost.

3. Referring to FIG. 5, the LED current-balance driving circuit located in the secondary side can be easily applied to the existed conventional LED driving circuit shown in FIG. 1.

4. Referring to FIG. 7, the LED current-balance driving circuit located in the primary side can be driven by using the high-voltage DC voltage VDC1 from the PFC circuit 106. Thus, the DC-to-DC converter 107 can be skipped to reduce the cost.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

We claim:

1. A light-emitting diode (LED) current-balance driving circuit for driving a plurality of LED strings, the LED current-balance driving circuit comprising:
   a feedback transformer having a detecting winding and an outputting winding for outputting a feedback signal;
   a plurality of current-balance transformers, each of the current-balance transformers having a primary winding and a secondary winding, the primary windings of the current-balance transformers and the detecting winding of the feedback transformer being coupled in series to compose a current-balance loop with an alternating-current (AC) power being supplied thereto;
   a plurality of full-wave rectifiers, each of the full-wave rectifiers being coupled between a corresponding secondary winding of the current balance transformers and a corresponding LED string of the LED strings; and
   a current control circuit for receiving the feedback signal and controlling the AC power according to the feedback signal.

2. The LED current-balance driving circuit according to claim 1, wherein the current-balance transformers employ isolated transformers.

3. The LED current-balance driving circuit according to claim 2, wherein the AC power is supplied by a non-isolated switching-mode power supply.

4. The LED current-balance driving circuit according to claim 3, wherein the non-isolated switching-mode power supply comprises:
   a commutation circuit for receiving an AC power input and converting the AC power input to a direct-current (DC) power;
   a power factor correction (PFC) circuit for receiving the DC power and converting the DC power to a high-voltage DC voltage; and
   a DC-to-AC converter for converting the high-voltage DC voltage to the AC power according the feedback signal.

5. The LED current-balance driving circuit according to claim 1, wherein the current-balance transformers employ non-isolated transformers.

6. The LED current-balance driving circuit according to claim 5, wherein the AC power is supplied by an isolated switching-mode power supply.

7. The LED current-balance driving circuit according to claim 6, wherein the isolated switching-mode power supply comprises:
   a commutation circuit for receiving an AC power input and converting the AC power input to a direct-current (DC) power;
   a power factor correction (PFC) circuit for receiving the DC power and converting the DC power to a high-voltage DC voltage;
   an isolated DC-to-DC converter for receiving the high-voltage DC voltage and converting the high-voltage DC voltage to a low-voltage DC voltage; and
   a DC-to-AC converter for converting the low-voltage DC voltage to the AC power according the feedback signal.

8. The LED current-balance driving circuit according to claim 5, wherein the AC power is supplied by a non-isolated switching-mode power supply.

9. The LED current-balance driving circuit according to claim 8, wherein the non-isolated switching-mode power supply comprises:
   a commutation circuit for receiving an AC power input and converting the AC power input to a direct-current (DC) power;
   a power factor correction (PFC) circuit for receiving the DC power and converting the DC power to a high-voltage DC voltage; and
   a DC-to-AC converter for converting the high-voltage DC voltage to the AC power according the feedback signal.

* * * * *